United States Patent Office 3,488,327
Patented Jan. 6, 1970

3,488,327
PREPARATION OF COATING MATERIALS
Fritz Kollinsky, Darmstadt-Eberstadt, and Klaus Hubner and Gerhard Markert, Ober Ramstadt-Eiche, Germany, assignors to Rohm & Haas G.m.b.H., Darmstadt, Germany
No Drawing. Filed June 30, 1967, Ser. No. 650,260
Int. Cl. C08f 7/12, 19/00
U.S. Cl. 260—78.3                     11 Claims

ABSTRACT OF THE DISCLOSURE

Copolymers including (A) acrylic and/or methacrylic acid esters, (B) an azlactone

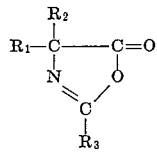

having a copolymerizable ethylenically unsaturated group $R_3$, and (C) a copolymerizable vinylidene compound having at least one free alcoholic hydroxy group therein, as well as coatings prepared by cross-linking the copolymers at room temperatures or up to 80° C.

---

The present invention relates to coating materials and to methods of making the same.

It is known in the art to coat substrate materials such as metal, wood, paper, cardboard, leather, or textiles with a solution or dispersion of film-forming plastics, or to use these as surface paints, and then subsequently to impart desired properties such as insolubility, increased surface hardness, and improved mechanical strength to the resulting coating by way of a cross-linking or hardening reaction. Exemplary of such cross-linking mechanisms is the cross-linking of copolymers consisting principally of acrylic acid esters or methacrylic acid esters, which copolymers are unexcelled from the viewpoint of colorlessness and resistance to weathering. These copolymers, partially comprising methylol compounds or capped methylol compounds, such as methylol ethers, of acrylamide or methacrylamide are cross-linked by heating, optionally under the additional influence of catalysts. If uneconomically long hardening times are to be avoided, temperatures of 120° C.–180° C. must be used for the cross-linking.

The present invention relates to coating materials comprising acrylic or methacrylic acid esters, which materials cross-link at room temperature or on gentle heating to about 80° C., optionally in the presence of an acid or alkaline catalyst and which when cross-linked form valuable firms. Coating materials according to the invention are prepared by copolymerizing: (A) at least 50 percent of at least one acrylic acid ester and/or methacrylic acid ester in which other monomers, such as acrylic acid, methacrylic acid, acrylonitrile, methacrylonitrile, acrylamide and/or methacrylamide and/or the N-substitution products of these amides, styrene, vinyl esters, esters of polymerizable dicarboxylic acids such as maleic, fumaric, or itaconic acids, or olefins can be present in an amount up to 49 percent; (B) 0.5–30 percent of an azlactone of the general formula

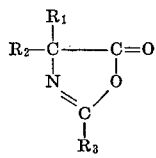

in which $R_1$ and $R_2$ taken alone each signify alkyl, cycloalkyl, aryl, or aralkyl, or taken together with a carbon atom to which they are joined signify a carbocyclic or heterocyclic ring, and $R_3$ is a group containing a polymerizable carbon-carbon double bond; and (C) 0.5 to 49.5 percent of a copolymerizable compound having a free alcoholic hydroxy group therein. All percentages are by weight of the combined monomers subjected to copolymerization.

The copolymerization proceeds in bulk, or as an emulsion or solution polymerization, at temperatures of from 0° C. to 200° C. in the presence of a free-radical initiator. Suitable initiators include azo compounds such as azo-bis (isobutyronitrile) and per compounds such as the peroxides (e.g. lauryl peroxide) and per-acids.

The copolymers of the invention are used as coating materials by applying a solution or dispersion thereof to a substrate to be coated and cross-linking them in situ, suitably after addition of a catalyst promoting cross-linking, e.g. either an inorganic or organic acid such as phosphoric acid or p-toluene sulfonic acid or a base such as a sodium alcoholate.

The acrylate and methacrylate esters of component (A) of the copolymer may be esters of aliphatic, cycloaliphatic aromatic, or heterocyclic alcohols. The esters include those of the alkanols as well as materials such as dimethylaminoethyl methacrylate, cyclohexyl methacrylate, benzyl acrylate, and $\beta$-(1-imidazolinyl)-ethyl methacrylate.

The following azlactones (or oxazolones) are exemplary of those which may be used as component (B) of the copolymer according to the invention: 2-isopropenyl-4,4 - dimethyl - oxazolone; 2 - isopropenyl - 4 - methyl-4-propyl-oxazolone; 2-isopropenyl-4,4-dipropyl-oxazolone; 2-vinyl-4-methyl-4-benzyl-oxazolone; 2-acrylyloxethyl - 4-methyl - 4 - cyclohexyl - oxazolone; 2 - vinyl - 4 - methyl-4 - phenyl - oxazolone; 2 - (2' - N - methacrylamido-isopropyl) - 4,4 - dimethyl - oxazolone; cyclohexane - spiro-4 - (2 - isopropenyl - oxazolone); and tetrahydropyran-4 - spiro - 4' - (2' - vinyl - oxazolone).

Azlactones can be considered to be anhydrides of α-acylamino acids and can be prepared from these acids by the removal of water, for example using acetic acid anhydride ("Organic Reactions," vol. 3, 1949, pages 198 et seq.). As exemplary of the preparation of a polymerizable azlactone, the reaction of α-amino isobutyric acid with methacrylic acid chloride, with subsequent ring closure, is shown below:

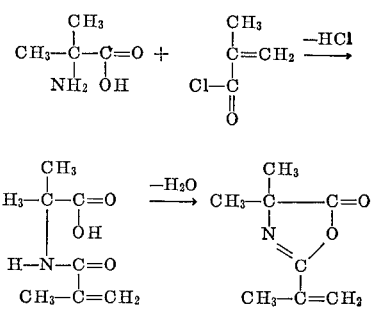

On copolymerization according to the present invention, an azlactone molecule is incorporated into the main chain of the macromolecule by way of the unsaturated polymerizable group shown earlier as $R_3$ in the general formula for the azlactone. On copolymerization, macromolecules are formed which carry both azlactone groups and hydroxy groups. By reaction of the azlactone group of a first macromolecule with the hydroxy group of a second macromolecule, ring opening occurs according to the following reaction together with a bonding of two macromolecules:

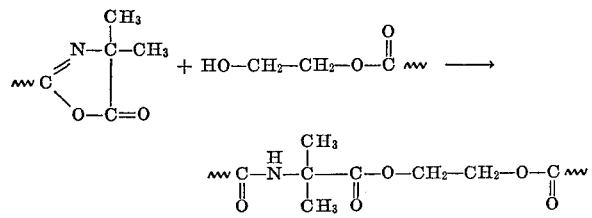

Since the bonding shown above occurs at several sites on every macromolecule, cross-linking occurs.

The azlactone may carry any unsaturated polymerizable group $R_3$ instead of the isopropenyl group shown in the formulas above, for example vinyl, acryloxyalkyl, methacryloxyalkyl, acrylamidoalkyl, or methacrylamidoalkyl. Azlactones which contain the above-mentioned unsaturated groups are easily prepared from an amino acid and from the chloride of an unsaturated acid containing the corresponding radical $R_3$, just as for the isopropenyl derivative. Although in principle all α-amino carboxylic acids can be used for the preparation of polymerizable azlactones, those azlactones prepared from α,α-disubstituted glycines, advantageously those prepared from α,α-dialkyl glycines, and specifically those prepared from α,α-dimethyl glycine, are preferred. On the one hand, these compounds are sufficiently stable to be simply prepared with good yields. On the other hand, they copolymerize well with other monomers and nevertheless promote easy and complete cross-linking upon reaction with bi-functional or polyfunctional compounds. It must be considered surprising that azlactones derived from a dialkyl glycine, particularly from dimethyl glycine, are easily obtainable stable monomers which readily copolymerize, and yet that the 5-membered ring incorporated into such a copolymer will open easily in the presence of an hydroxy group to permit bond formation by way of addition according to the exemplary formulas given earlier. The utility of such dialkylated azlactones in carrying out the process according to the invention is increased by the fact that they are easily prepared on a large scale from cheap starting materials.

As the copolymerizable azlactone-deactive hydroxylic component (C), hydroxy compounds having a vinylidene ($CH_2=C=$) group therein are particularly useful. Such monomers include the acrylate and methacrylate monoesters of dihydroxy and polyhydroxy compounds, as well as the acrylamides and methacrylamides of hydroxyamines, such as the monoacrylate and monomethacrylates of ethylene glycol, glycerine, pentaerythritol, and butane diol, and the acrylic and methacrylic acid amides of ethanolamine. The surprisingly easy cross-linking of the coating materials according to the present invention at ordinary temperatures or on slight warming, and/or on addition of a catalyst such as phosphoric acid or a sodium alcoholate, has already been mentioned. Cross-linking takes place quantitatively, and at room temperature in many cases. The cross-linking reaction is an addition reaction: no by-products are produced by the reaction.

To prepare coatings, the copolymers of the invention are dispersed, that is dissolved or suspended, in a volatile organic liquid such as an ester, hydrocarbon, ether, or ketone. This material is then applied to a substrate by brushing, spraying, dipping, or other usual techniques.

The new coating materials are superior to previously known coating materials in a variety of useful properties. Products which are extraordinarily stable toward hydrolysis, temperature, and the influence of weathering are produced on cross-linking.

A better understanding of the present invention and of its many advantages will be had by referring to the following specific examples, given by way of illustration. In the examples, all parts are by weight.

EXAMPLE 1

A mixture of 50 parts of n-butyl acrylate, 25 parts of methyl methacrylate, 6 parts of β(imidazolinyl-1)-ethyl methacrylate, 7 parts of 2-isopropenyl-4,4-dimethyl-oxazolone, 12 parts of β-hydroxyethyl acrylate, 1.2 parts by weight of dilauryl peroxide, and 100 parts of butyl acetate was divided into two equal portions. Half of the mixture was warmed to about 70° C. in a reaction vessel with stirring. After the onset of polymerization, the mixture was held at about 70° C.–80° C. while the remaining half of the mixture was run in. One hour after addition was completed, a further 0.2 part of the dilauryl peroxide initiator was added. The solution was warmed at 70° C.–80° C. for another four to five hours.

Insoluble films were obtained from the solution after the addition of 0.1 part of phosphoric acid.

EXAMPLE 2

A mixture of 35 parts of 2-ethyl-hexyl acrylate, 40 parts of methyl methacrylate, and 10 parts of 2-acryloxyethyl-4-methyl-4-cyclohexyl-oxazolone was polymerized as in Example 1 in 60 parts of methyl-ethyl ketone and 40 parts of ethylene glycol acetate in the presence of 1.5 parts of azo bis(isobutyronitrile).

The solution polymer formed insoluble films after the addition of 0.1 part of trichloroacetic acid.

EXAMPLE 3

A mixture of 55 parts of n-butyl methacrylate, 10 parts of N-methyl methacrylamide, 10 parts of 2-vinyl-4-methyl-4-ethyl oxazolone, and 25 parts by weight of N-(β-hydroxyethyl)-methacrylamide was polymerized as in Example 1 in the presence of 1.5 parts of azo bis(isobutyronitrile) in 60 parts of methyl isobutylketone and 40 parts of butyl acetate.

Insoluble films were formed by the solution after the addition of 0.2 part of p-toluene sulfonic acid.

EXAMPLE 4

A mixture of 27 parts of cyclohexyl methacrylate, 33 parts of n-hexyl acrylate, 12 parts of styrene, 8 parts of acrylonitrile, 8 parts of 2-(2'-N-methacrylamido)-isopropyl-4,4-diethyl oxazolone, and 12 parts of 2,3-dihydroxy propylacrylate was polymerized as in Example 1 with 1.5 parts of dilauryl peroxide in 35 parts of toluene and 65 parts of butyl acetate.

After the addition of 0.3 part of pivalic acid, insoluble films could be formed from the solution.

EXAMPLE 5

A mixture of 45 parts of benzyl acrylate, 7 pats of β-dimethylamino-ethyl methacrylate, 10 parts of dimethyl fumarate, 12 parts of tetrahydropyran-4-spiro-4'-(2'-vinyl-oxazolone), and 26 parts of butane diol monoacrylate was polymerized as in Example 1 with 1.6 parts of azo bis(isobutyronitrile) in 70 parts of butyl acetate and 30 parts of xylene.

After the addition of 1 part of a 30 percent solution of sodium methylate in methanol, insoluble films were obtained.

What is claimed is:
1. A copolymer capable of cross-linking in the absence of an external cross-linking agent, said copolymer consisting essentially of (A) at least 50 percent of at least one ester of acrylic or methacrylic acid; (B) 0.5 to 30 percent of an azlactone of the formula

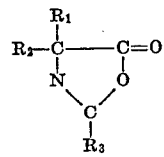

wherein $R_1$ and $R_2$ taken alone are alkyl or cycloalkyl but at least one of $R_1$ and $R_2$ is alkyl, or wherein $R_1$ and $R_2$ taken together with the carbon atom to which they are joined form a carbocyclic ring, and $R_3$ is vinyl, isopropenyl, acryloxyalkyl, methacryloxyalkyl, acrylamidoalkyl, or methacrylamidoalkyl; (C) 0.5 to 49.5 percent of a polymerizable vinylidene compound having at least one free alcoholic hydroxy group, all percentages being by weight of the copolymerized monomers.

2. A copolymer as in claim 1 wherein said azlactone has a 4,4-dialkyl substituent.

3. A copolymer as in claim 1 wherein said azlactone has a 4,4-dimethyl substituent.

4. A copolymer as in claim 1 which additionally includes up to 49 percent, by weight of all copolymerized monomers, of a comonomer selected from the group consisting of: acrylic acid; methacrylic acid; acrylonitrile; methacrylonitrile; acrylamide, methacrylamide, and N-substitution products of these amides; styrene; vinyl esters; and esters of copolymerizable dicarboxylic acids.

5. A copolymer as in claim 1 wherein said compound (C) is a vinylidene compound.

6. A copolymer as in claim 1 dispersed in a volatile organic liquid.

7. A copolymer as in claim 4 dispersed in a volatile organic liquid.

8. The method of making the copolymer of claim 1 which comprises copolymerizing (A) at least 50 percent of at least one ester of acrylic or methacrylic acid, (B) 0.5 to 30 percent of an azlactone of the formula

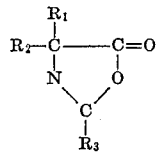

wherein $R_1$ and $R_2$ taken alone are alkyl or cycloalkyl but at least one of $R_1$ and $R_2$ is alkyl, or wherein $R_1$ and $R_2$ taken together with the carbon atom to which they are joined form a carbocyclic ring, and $R_3$ is vinyl, isopropenyl, acryloxyalkyl, methacryloxyalkyl, acrylamidoalkyl, or methacrylamidoalkyl; and (C) 0.5 to 49.5 percent of a polymerizable vinylidene compound having at least one free alcoholic hydroxy group, at a temperature of from 0° C. to 200° C. in the presence of a free radical initiator.

9. The method as in claim 8 wherein up to 49 percent, by weight of all copolymerized monomers, of a comonomer selected from the group consisting of: acrylic acid; methacrylic acid; acrylonitrile; methacrylonitrile; acrylamide, methacrylamide, and N-substitution products of these amides; styrene, vinyl esters and esters of copolymerizable dicarboxylic acids, is additionally co-polymerized.

10. The method of forming a cross-linked product from the copolymer of claim 1 which comprises maintaining said copolymer at a temperature from about 15° C. to about 80° C. until cross-linking occurs.

11. The method as in claim 10 wherein said cross-linking is accelerated by the presence of an acid or base to catalyze the cross-linking.

References Cited

"Organic Reactions," vol. 3, 1949, pp. 215, 217–18.

JOSEPH L. SCHOFER, Primary Examiner
JOHN KIGHT, Assistant Examiner

U.S. Cl. X.R.

260—78, 31.2, 32.8, 33.2, 33.6